United States Patent
Pardoe et al.

(10) Patent No.: US 7,650,833 B2
(45) Date of Patent: Jan. 26, 2010

(54) METHOD AND APPARATUS FOR FOOD PREPARATION AND HOLDING STATION SYNCHRONIZATION

(75) Inventors: Michael Pardoe, Essex (GB); James T. Miller, Canton, GA (US)

(73) Assignee: Technology Licensing Corporation, Fort Lauderdale, FL (US)

(*) Notice: Subject to any disclaimer, the term of this patent is extended or adjusted under 35 U.S.C. 154(b) by 241 days.

(21) Appl. No.: 11/524,604

(22) Filed: Sep. 21, 2006

(65) Prior Publication Data

US 2007/0062379 A1  Mar. 22, 2007

Related U.S. Application Data

(60) Provisional application No. 60/719,087, filed on Sep. 21, 2005.

(51) Int. Cl.
*A47J 27/62* (2006.01)
*H05B 3/06* (2006.01)

(52) U.S. Cl. .............. 99/331; 99/448; 99/468; 99/483; 99/373; 99/374; 99/467; 219/521; 219/494; 219/486; 219/506; 219/214; 219/395

(58) Field of Classification Search ............ 99/448, 99/468, 483, 373–4, 467, 331; 219/521, 219/494, 486, 506, 214, 395
See application file for complete search history.

(56) References Cited

U.S. PATENT DOCUMENTS

| 7,132,926 B2 | 11/2006 | Vaseloff et al. |
| 2002/0082924 A1 | 6/2002 | Koether |
| 2004/0056761 A1* | 3/2004 | Vaseloff et al. ........ 340/309.16 |

OTHER PUBLICATIONS

The International Search Report and the Written Opinion of the International Searching Authority, or the Declaration (PCT/US06/36777 (Form PCT/ISA 210 & Form PCT/ISA/237).

* cited by examiner

*Primary Examiner*—Shawntina Fuqua
(74) *Attorney, Agent, or Firm*—Howard M. Gitten; Edwards Angell Palmer & Dodge LLP

(57) ABSTRACT

A system for synchronization of a food preparation appliance and a holding station comprising a food preparation appliance for processing a food during a food preparation cycle and a holding station for maintaining food for a first predetermined period of time. The appliance and holding station communicate with each other. The appliance sends a signal to at least one holding when the food is transferred after the completion of the food processing cycle. A timer operatively coupled to the holding station. The timer countdown the elapsed time after the food has been prepared. Upon food transfer from appliance to the holding station, the remaining countdown is transferred from the appliance timer to the holding station timer. Holding station has a first countdown of the first elapsed time period and a second countdown of a time period less than the first elapsed time period by a predetermined time period.

13 Claims, 2 Drawing Sheets

METHOD AND APPARATUS FOR FOOD PREPARATION AND HOLDING STATION SYNCHRONIZATION

CROSS-REFERENCE TO RELATED APPLICATIONS

This Application is a Non-Provisional of Provisional application 60/719,087, entitled METHOD AND APPARATUS FOR FOOD PREPARATION AND HOLDING STATION SYNCHRONIZATION, filed on Sep. 21, 2005 under (35 USC 119(e)).

BACKGROUND OF THE INVENTION

This invention is directed to the synchronization between a food preparation apparatus and a food holding station and, in particular, a method and apparatus for synchronizing the amount of food leaving the holding station during a given time period and being prepared at the preparation appliance.

As is known in the art in commercial kitchens, food is prepared at a food processing appliance such as an oven, a fryer or the like. However, in order to meet demand, more food than is immediately necessary is often prepared. Therefore, restaurants, cafeterias, quick serve restaurants and the like make use of holding stations, usually heated devices near the point-of-sale or service to maintain the food in a heated edible condition. However, food safety guidelines put maximum limits on the amount of time at which food may be held at the holding station. By way of example, fried fish may be held at a holding station for only forty minutes. After the forty-minute holding period, the food cannot be used for restaurant consumption.

Often, the holding station is remote from the food preparation area. Currently, servers must empirically monitor the holding station to determine when food will run out. Food may run out by either consumption or the elapsing of the holding time. The holding time requires continuous monitoring by food servers. As servers monitor the holding station, they will indicate to the food preparers that more food may be required. However, as a result of servers multitasking with functions other than monitoring the holding area, the holding area runs out of food product before the holding time elapses, or the holding time elapses before an order is made to the food preparation area for more food. As a result, the holding area may go empty even when there is demand for food.

Accordingly, a method and apparatus for overcoming this shortcoming is desired.

BRIEF SUMMARY OF THE INVENTION

A food preparation appliance is in communication with at least one holding station. Each holding station is provided with a countdown timer. The timer counts a holding station cycle. The holding station transmits a signal to the food preparation appliance to prepare more food at a predetermined time interval ahead of the termination of the holding station cycle. The appliance signals to the holding station to begin the countdown of the holding station cycle after completion of a food preparation cycle.

BRIEF DESCRIPTION OF THE DRAWINGS

For a fuller understanding of the invention, reference is had to the following description taken in connection with the accompanying drawing.

DETAILED DESCRIPTION OF THE INVENTION

Figure 1:
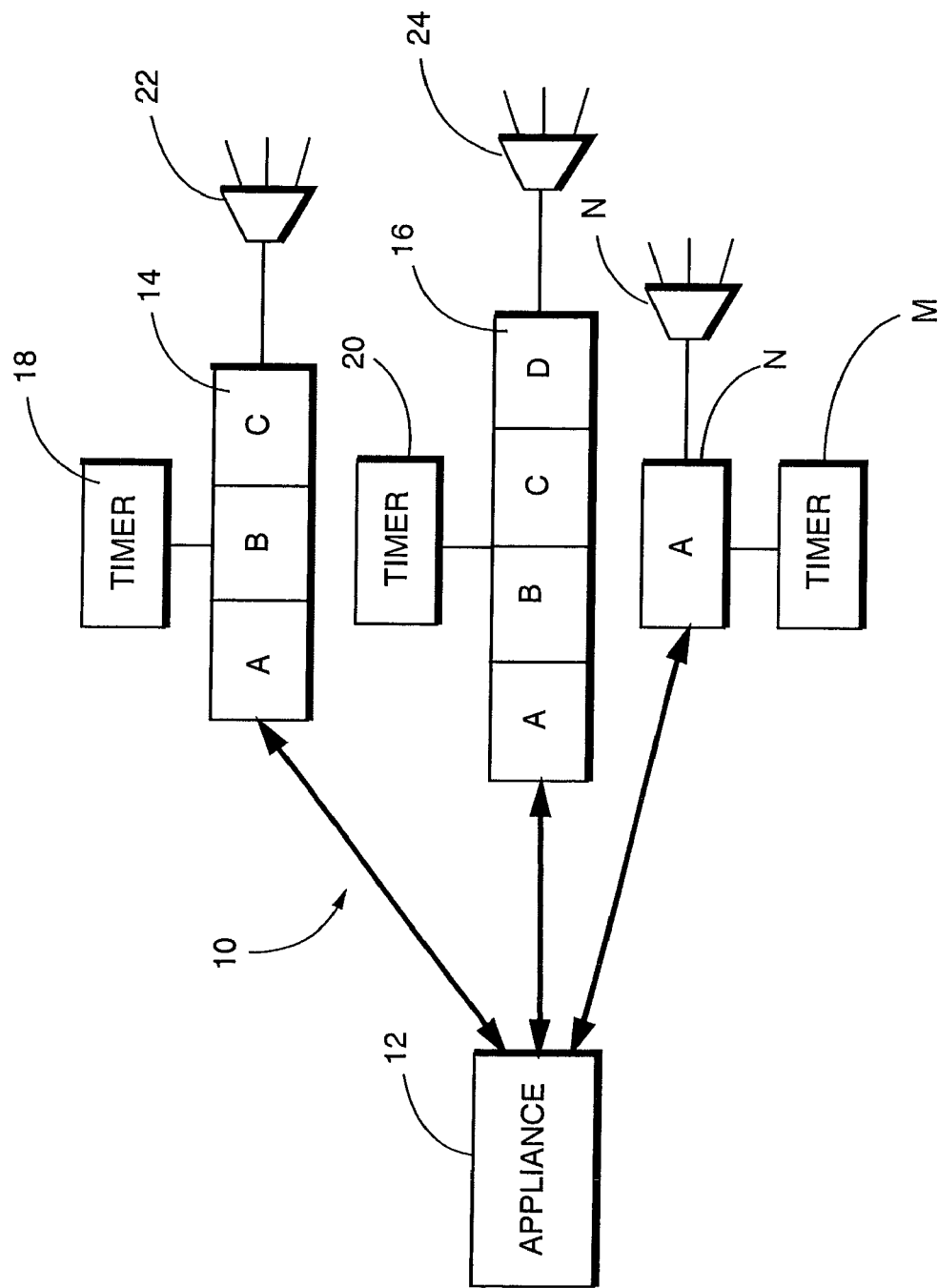
FIG. 1 is a schematic view of a system constructed in accordance with the invention.

Reference is made to FIG. 1 in which a system, generally indicated as 10 for synchronizing an appliance to a holding station is provided. An appliance 12 is utilized for preparing food. Appliance 12 may be a fryer, an oven, hot plate, stove, freezer or the like. As is known in the art, appliance 12 is operated under the control of a controller so that the push of a button begins a preparation cycle. By way of example, when cooking french fries, it may be a timed fry cycle, with meat it may be a timed oven cook cycle, with pastries it may be a timed baking, steam and air convection cycle, with ice cream it may be a timed freezing cycle. A trigger causes the cycle to begin. The trigger may be depressing a button on appliance 12, it may be the opening and closing of an oven or refrigerator door, it may be dropping a basket into a fryer across a triggered sensor, or it may be barcode or RFID controlled programming of appliance 12.

A plurality of holding stations 14, 16-N are communicatively coupled to appliance 12. Communication between appliance 12 and respective holding station 14-N is two-way communication. Each holding station 14-N is provided with a respective address known at appliance 12 or by the operator of appliance 12. Furthermore, as known in the art, each individual holding station 14-N may include one or more holding channels A-D to allow for the holding of a variety of foods under different conditions. Holding station 14 may be a plurality steam trays, while holding station 16 may be a plurality of different channeled A-D heat lamps at a variety of temperatures, whereas holding station N may be chilled.

Each holding station 14-N has an associated countdown timer 18, 20, N for counting down an elapsed holding period. Each holding station 14, 16, N is also provided with an alarm or indicator 22, 24, M. For ease of description each timer and alarm is shown as a separate device, but as is known in the art, they may be integrated within the control system for the holding station.

Generally, during use, as food is processed by appliance 12, appliance 12 signals a holding station 14 when the processing cycle is complete or upon transfer of the food to the holding station 14. In the example of a fish filet, when the frying cycle is completed, appliance 12 signals holding station 14 that fish filet cooking has been completed. Alternatively appliance 12, upon the completion of the processing cycle, begins a countdown and upon transfer of the food to the holding 14 sends the signal. In response to this signal, timer 18 begins to countdown the elapsed time period. In connection with the fish filet, timer 18 counts two cycles; the first holding cycle being the elapsed 40 minutes, by way of example, before the food must be removed from the holding station.

Furthermore, because all of the food held at holding station 14 within a particular channel, assuming each channel corresponds to a different food batch or type, must be removed at the end of a holding cycle, there must be some lag time to prepare replacement food at appliance 12. Accordingly, timer 18 also counts a second holding cycle, which is a predetermined amount of time less than the first holding cycle (entire food spoilage elapsed time). It should be noted that timer 18 is associated with a holding station 14 for ease of description. However, timer 18 only need be associated with a holding station. It is well within the scope of the invention that timer 18 be incorporated in appliance 12.

Figure 2:
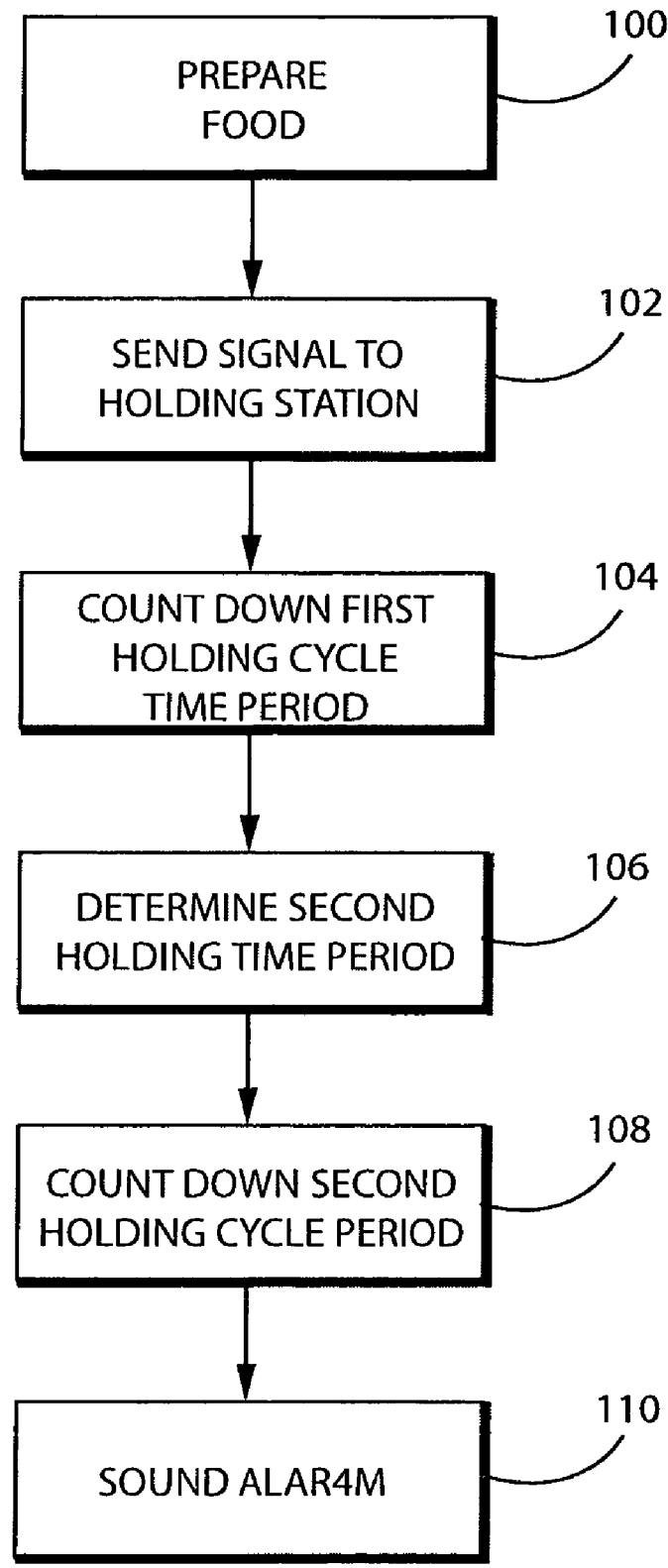
FIG. 2 is a flow chart of the method for synchronizaing a holding station in accordance with the invention.

Reference is now made to FIG. 2 in which a specific method for operating the holding station in accordance with the invention is provided. In a step 100, kitchen appliance 12 prepares food by performing a food preparation cycle. Appliance 12 sends a signal to any one of holding stations 14-*n* in a step 102.

In a step 104, timer 18, by way of example, begins a first countdown of a first holding cycle time period in response to the signal which is after completion of the food preparation cycle. A second holding cycle time period is determined in a step 106. In a step 108, the second holding cycle time period is counted down. Optionally, an alarm may be sounded in a step 110 to indicate the end of either the first or second holding cycle. The alarm may be audio, visual or the like to indicate to a user the end of either of the first or second holding time cycles.

In the example, if six minutes is required to prepare additional fish filets and convey them to holding station 14, then the predetermined amount of time is six minutes and, in our non-limiting example, a 34-minute cycle is counted down at timer 18 as the second holding cycle. Accordingly, as timer 18 counts an elapsed 34-minute period, it causes holding station 14 to transmit a signal to appliance 12 to prepare more fish filets. When timer 18 counts the complete 40-minute interval, it causes alarm/indicator 22 to signal a server to remove the 40-minute old fish filets from the respective channel A, B, C in which the food is being held. The interval corresponds to the spoilage period for the food, i.e., the holding time after which it cannot be served.

If the food within the holding area is consumed before a cycle of timer 18 has elapsed, a server may depress a signaling button on holding station 14, by way of example, to signal appliance 12 that more food must be made. In other words, a request for more product is sent from the holding area back to the cooking area. This signaling can be accomplished in a number of ways including the pressing of a button, the scanning of a barcode or the reading of an RFID tag or the like. It could be triggered by the channel being a scale; the request being sent when the scale measures less than a predetermined weight corresponding to the need for a refill. It should also be noted that the communication between appliance 12 and holding stations 14-N may be hard wired, wireless, over a local area network, cellular network, infrared or other type of wireless communication across an area.

In another embodiment, appliance 12 is capable of making a variety of foods. By way of example, a fryer may make fish filets, onion rings, chicken strips, chicken wings, shrimp, french fries or the like. Each has its own hold time period. Appliance 12 determines and stores the type of food being processed and the associated hold time. Upon completion of a cook cycle, it transfers the associated hold time to a selected holding station to trigger the associated time to begin the countdown period for the just processed food item.

Each holding station is provided with an address. For simplicity, the address for the first holding station may be 14, the second holding station may be 16 and the third holding station may be N. Furthermore, each holding station has addressable channels A, B, C, D or any subset thereof so that a user of appliance 12 may select the holding station to which the food is to be sent based upon identified demand. This may be done by a series of prompts at appliance 12 including the option of taking default settings as stored at appliance 12 or overriding and entering either the channel address of a fixed holding station address, a fixed channel of a variable holding station address, or selecting both the station address and the channel address.

By providing a system with two-way communication between the holding station and the appliance for sending a request for a designated holding station to receive food and/or request back for more product from the holding station, gaps between available foods at a particular holding station are significantly reduced if not eliminated.

Thus, while there have been shown, described and pointed out novel features of the present invention as applied to preferred embodiments thereof, it will be understood that various omissions and substitutions and changes in the form and detail are contemplated so that the disclosed invention may be made by those skilled in the art without departing from the spirit and scope of the invention. It is the intention, therefore, to be limited only as indicated by the scope of the claims appended hereto. It is also to be understood that the following claims are intended to cover all of the generic and specific features of the invention herein described and all statements of the scope of the invention, which, as a matter of language, might be said to fall therebetween.

The invention claimed is:

1. A system for synchronization of a food preparation appliance and a holding station comprising:
   a food preparation appliance for processing a food during a food preparation cycle;
   a holding station for maintaining food during a first holding cycle time period, said appliance and said holding station being in communication with each other, said appliance sending a signal to said at least one holding station after completion of said food processing cycle; and
   a timer operatively coupled to said holding station, said timer beginning a first countdown of said first holding cycle time period in response to a start signal from said food preparation appliance, and a second countdown of a second holding cycle time period in response to said signal; said second holding cycle time period being less than said first holding cycle time period by a predetermined time period, and said holding station signaling said food preparation appliance to prepare the food at a completion of the second holding cycle time period.

2. The system of claim 1, wherein said start signal indicates completion of a food preparation cycle.

3. The system of claim 1, wherein said holding station includes an indicator, said timer enabling said indicator at the end of said first holding cycle time period.

4. The system of claim 1, wherein said holding station includes at least one channel, said appliance assigning an address to each of said at least one holding station and at least one channel, and addressing said holding station and said at least one channel after said completion of said food preparation cycle.

5. A system for synchronization of a food preparation appliance and a holding station comprising:
   a food preparation appliance for processing a food during a food preparation cycle;
   a holding station for maintaining an inventory of said food after the completion of said food preparation cycle, said appliance and said holding station being in communication with each other;
   said holding station sending a signal for a request to prepare more food to said food preparation appliance whenever the amount of said food in said holding station reaches a predetermined level.

6. The system of claim 5, wherein said signal is activated by depressing a button.

7. The system of claim 5, wherein said signal is activated by scanning a bar code.

8. The system of claim 5, wherein said signal is activated by the reading of an RFID tag.

9. A system for synchronization of a food preparation appliance and a holding station comprising:
- a food preparation appliance for processing a food during a food preparation cycle
- a holding station for maintaining an inventory of said food after the completion of said food preparation cycle, said appliance and said holding station being in communication with each other; and
- said food preparation appliance initiating a countdown of an elapsed time after completion of said food preparation cycle; and
- a timer operatively coupled to said at least one holding station; and
- said food preparation appliance sending a signal indicating a remaining countdown to said timer upon the transfer of said food to said holding station.

10. A method for synchronization of a food preparation appliance and a holding station comprising the steps of:
- performing a food preparation cycle at the food preparation appliance;
- sending a first signal from the food preparation appliance to said holding station after completion of said food processing cycle;
- beginning a first countdown with a timer of a first holding cycle time period in response to the first signal after completion of the food preparation cycle;
- determining a second holding cycle time period being less then said first holding cycle time period and beginning a second countdown with a timer of the second holding cycle time period in response to said signal; and sending a second signal from the holding station to the appliance as a request to prepare more food when the amount of food in said holding station reaches a predetermined level.

11. The method of claim 10, wherein said first holding cycle time period corresponds to a spoilage time period for food at said holding station.

12. The method of claim 10, wherein said second holding cycle time period corresponds to a time period which allows for the repeat of the food preparation cycle prior to completion of said first holding cycle time period.

13. The method of claim 10, further comprising the step of triggering an alarm at the end of said first holding cycle time period.

* * * * *